United States Patent
Maeda et al.

(10) Patent No.: US 6,738,567 B2
(45) Date of Patent: May 18, 2004

(54) PHOTOGRAPH VENDING MACHINE

(75) Inventors: Tadasu Maeda, Kyoto (JP); Hyoue Tamura, Kyoto (JP); Masamichi Akima, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/110,411

(22) PCT Filed: Aug. 20, 2001

(86) PCT No.: PCT/JP01/07132

§ 371 (c)(1),
(2), (4) Date: Apr. 12, 2002

(87) PCT Pub. No.: WO02/17015

PCT Pub. Date: Feb. 28, 2002

(65) Prior Publication Data

US 2002/0154905 A1 Oct. 24, 2002

(30) Foreign Application Priority Data

Aug. 25, 2000 (JP) .................................... 2000-255548
Apr. 26, 2001 (JP) .................................... 2001-128916

(51) Int. Cl.$^7$ .............................................. G03B 15/00
(52) U.S. Cl. ................................ 396/2; 396/4; 348/373
(58) Field of Search .............................. 396/2; 348/373

(56) References Cited

U.S. PATENT DOCUMENTS

| | | | |
|---|---|---|---|
| 5,196,876 A | * | 3/1993 | Thayer ........................... 396/2 |
| 5,778,258 A | * | 7/1998 | Zamoyski ....................... 396/2 |
| 5,897,220 A | * | 4/1999 | Huang et al. ................... 396/2 |
| 5,923,406 A | | 7/1999 | Brasington et al. |
| 6,317,560 B1 | * | 11/2001 | Kawabata ....................... 396/2 |

FOREIGN PATENT DOCUMENTS

| | | |
|---|---|---|
| JP | 5-44966 | 6/1993 |
| JP | 3049553 | 4/1998 |
| JP | 3061521 | 6/1999 |
| JP | 11-160785 | 6/1999 |
| JP | 2000-81652 | 3/2000 |
| JP | 2000-137284 | 5/2000 |
| JP | 2000-194061 | 7/2000 |
| JP | 2001-91985 | 4/2001 |
| JP | 2001-296600 | 10/2001 |

* cited by examiner

*Primary Examiner*—David M Gray
(74) *Attorney, Agent, or Firm*—Dickstein Shapiro Morin & Oshinsky LLP

(57) ABSTRACT

An automatic photograph sticker vending machine (11) is provided with a camera (21) for picking up an image of a subject, an illuminating device (22) for illuminating the subject, a display (16) for displaying various information such as the image, an input device (17) manipulated from outside for inputting information, and a printer (26) for printing onto sticker paper a photograph of the subject obtained by image pickup with the camera and discharging the sticker paper (33) having the photograph printed thereon. The camera (21) is provided at a ceiling portion of a region for image pickup (12) with a lens for image pickup directed downward. Thus, the camera (21) can pick up an image of the subject by looking down upon the subject from directly above so that a photograph sticker (33) obtained by photographing at an original angle can be sold.

14 Claims, 13 Drawing Sheets

PHOTOGRAPH VENDING MACHINE

DESCRIPTION

1. Technical Field

The present invention relates to an automatic photograph vending machine which, for instance, is provided in an amusement facility such as a video arcade and automatically sells a photograph of a subject obtained by picking up an image of the subject with a digital camera and the like, and more specifically, to an automatic photograph vending machine that prints a photograph on a medium such as sticker paper, and thereafter, outputs and sells the medium.

2. Background Art

Conventionally, an automatic photograph sticker vending machine is known that automatically sells paper for stickers (hereinafter referred to as sticker paper) having printed on a surface a photograph obtained by image pickup mentioned above (hereinafter, referred to as a photograph sticker). The automatic photograph sticker vending machine is provided with a digital camera for picking up an image of a subject, an illuminating portion such as a stroboscopic lamp for illuminating the subject, a display portion for visibly displaying an image and various information, an input portion having a switch of various kinds such as a start button manipulated by a customer for starting image pickup, and a printing portion for printing onto sticker paper a photograph obtained by picking up an image of the subject with the digital camera. The above-described digital camera is incorporated inside a housing of the automatic photograph sticker vending machine.

According to the conventional automatic photograph sticker vending machine, an image of a subject can be picked up from various angles by setting the angles for image pickup of the digital camera to a direction from the front of the subject, a direction diagonally upward relative to the subject, and a direction diagonally downward relative to the subject; however, the image of the subject cannot be picked up from directly above. In addition, a digital camera to which cables are connected can be disposed at any given position of the housing of the automatic photograph sticker vending machine to pick up an image of the subject at any given angle. It is difficult, however, to provide the digital camera in a fixed manner directly above the housing so that it is impossible to pick up the image of the subject from directly above.

Thus, the object of the present invention is to provide an automatic photograph vending machine capable of picking up an image of a subject by looking down upon the subject from directly above.

DISCLOSURE OF THE INVENTION

An automatic photograph vending machine according to one aspect of the present invention is for selling a photograph of a subject and is provided with an image pickup portion for picking up an image of a subject in an image pickup region set as a space for image pickup to output image data of a subject image, and a printout portion for printing onto a medium a photograph of the subject according to the image data outputted from the image pickup portion, and thereafter, outputting the medium to the outside. The image pickup portion is provided at a ceiling portion of the image pickup region and a direction of image pickup corresponds to a direction of looking down upon the subject from directly above.

The above-described image pickup portion includes a digital camera, a digital video camera or the like. The printout portion may be formed by a monotone printer, a sepia tone printer, or a color printer. The image pickup region may be set as an image pickup space in which one person or a plural number of persons (subject or subjects) can assume a pose. The provision of the image pickup portion to the ceiling portion can be effected by disposing it buried in the ceiling portion, or by hanging it from the ceiling.

Since the above-described image pickup portion is provided such that the direction of image pickup corresponds to the direction of looking down upon the subject from directly above, for instance, by directing the lens (lens for image pickup) downward, and is provided at the ceiling portion of the image pickup region, a medium having printed thereon a photograph of an image picked up at an original angle can be sold to a customer.

Thus, a new image pickup experience can be provided to the customer (subject), and improvement in customer satisfaction can be achieved.

The above-described automatic photograph vending machine further includes an illuminating portion for illuminating a subject upward from below. The illuminating portion includes an illuminating lamp such as a fluorescent lamp and an incandescent lamp or a stroboscopic illuminating device. The illuminating portion is disposed at a floor portion or in a vicinity of the floor portion of the image pickup region. Thus, uniform quantity of light of illumination (illuminance) can be ensured regardless of the magnitude of the distance between the subject and the image pickup portion due to the difference in height of the subject and so on.

The above-described automatic photograph vending machine further includes in a vicinity of the image pickup portion a pose check portion for allowing a subject to check his/her own pose. The pose check portion can be formed by a mirror arranged at the ceiling portion or a monitor device that displays in real time a monitor image of image data outputted from the image pickup portion. Thus, since the customer (subject) can check his/her own pose using the pose check portion, it becomes easier for him/her to assume a desired pose.

The image pickup portion of the above-described automatic photograph vending machine may have a magnification adjustment function for adjusting a magnification of the subject image. Specifically, the image pickup portion includes a digital camera, a digital video camera or the like having a zoom function. Thus, it becomes possible to pick up an image by enlarging/reducing the image according to the magnitude of the distance between the subject and the image pickup portion due to the difference in height and so on. Consequently, it becomes possible to pick up an image with the face enlarged or with the subject image reduced in order to secure a greater area of background, which provides further satisfaction to the customer.

In addition, the pose check portion is formed by a monitor device for displaying a monitor image by enlarging/reducing the monitor image in real time. Thus, the customer (subject) can check his/her own size using the pose check portion so that the image pickup according to the desired size becomes easily possible.

The above-described automatic photograph vending machine may further include a display portion for displaying an image and necessary information (including a message of manipulating procedure), an input portion formed by an input device by a touch panel or an input device by a switch, and a control portion formed by a control device such as a CPU (abbreviation for central processing unit) for controlling each portion. The input portion is manipulated by the customer for inputting various information.

An automatic photograph vending machine according to another aspect of the present invention is for selling a photograph of a subject and is provided with an image pickup portion, an input portion, and a printout portion. The image pickup portion picks up an image of a subject in an image pickup region set as a space for image pickup to output image data of a subject image. The input portion is externally manipulated to input information. The printout portion prints onto a medium a photograph of the subject according to the image data outputted from the image pickup portion, and thereafter, outputs the medium to the outside. The image pickup portion has a first image pickup portion which is provided at a ceiling portion of the image pickup region and whose direction of image pickup corresponds to a direction of looking down upon the subject from directly above and a second image pickup portion which is provided at a side portion of the image pickup region and whose direction of image pickup corresponds to a direction different from the direction of looking down from directly above. One of the first image pickup portion and the second image pickup portion is activated based on the information inputted by the input portion.

Each of the first image pickup portion and the second image pickup portion includes a digital camera, a digital video camera or the like.

The activation of one of the first image pickup portion and the second image pickup portion based on the information inputted by the input portion means the customer manipulating the input portion to select a desired one of the first image pickup portion and the second image pickup portion and activating the selected one. Selective activation can be performed via a switching device such as a switching circuit.

Thus, an appropriate image pickup condition can be ensured with either the first image pickup portion or the second image pickup portion selectively activated, and the customer can choose a desired one of the image pickup by an angle other than from directly above and the image pickup by an angle from directly above.

The above-described automatic photograph vending machine may further include an illuminating portion having a first illumination state in which a subject is illuminated for image pickup by the first image pickup portion and a second illumination state in which the subject is illuminated for image pickup by the second image pickup portion and a switching portion. The switching portion activates one of the first image pickup portion and the second image pickup portion based on the information inputted by the input portion, and sets the illuminating portion to one of the first illumination state and the second illumination state. The illuminating portion includes an illuminating lamp such as a fluorescent lamp and an incandescent lamp or a stroboscopic illuminating device.

The selection by manipulation of the input portion means switching to one of a first manner using the first image pickup portion and the first illumination state and a second manner using the second image pickup portion and the second illumination state.

The above-described automatic photograph vending machine may further include a display portion for displaying an image and necessary information and a control portion for controlling each portion.

In the above-described automatic photograph vending machine, the illuminating portion may have a floor illuminating portion disposed at a floor portion or in a vicinity of the floor portion of the image pickup region and a side illuminating portion provided on a side portion of the image pickup region and may allow one of the first image pickup portion and the second image pickup portion as well as one of the floor illuminating portion and the side illuminating portion to be activated based on the information inputted by the input portion.

Thus, the selection by manipulation of the input portion means switching to a desired one of a manner using the first image pickup portion and the floor illuminating portion and a manner using the second image pickup portion and the side illuminating portion.

The above-described first image pickup portion may have a magnification adjustment (zoom) function for adjusting a magnification of a subject image, or the second image pickup portion may have the magnification adjustment function. The first image pickup portion and/or the second image pickup portion includes a digital camera, a digital video camera or the like, and both may each be provided with the zoom function. Consequently, it becomes possible to pick up a subject image by enlarging/reducing the image according to the magnitude of the distance between a subject and the image pickup portion due to the difference in height and so on. In addition, it becomes possible to pick up an image with the face enlarged or with the subject image reduced in order to secure a greater area of the background, which provides further satisfaction to the customer.

The above-described automatic photograph vending machine may further include a pose check portion for allowing a subject to check his/her own pose. The pose check portion is provided, one in the vicinity of the first image pickup portion and one in the vicinity of the second image pickup portion, respectively. The pose check portion may be formed by a mirror arranged at the ceiling portion or a monitor device that displays in real time a monitor image according to image data outputted from the image pickup portion.

Thus, since the customer (subject) can check his/her own pose using the pose check portion, it becomes easier for him/her to decide on a desired pose.

An automatic photograph vending method according to a further aspect of the present invention is for selling a photograph of a subject and includes an image pickup step and a printout step. In the image pickup step, an image of a subject in an image pickup region set as a space for image pickup is picked up with an image pickup portion prepared in advance, and image data of a subject image is outputted. In the printout step, a photograph of the subject according to the image data outputted by the image pickup step is printed onto a medium, and thereafter, the medium is outputted to the outside. The image pickup portion is provided at a ceiling portion of the image pickup region and a direction of image pickup corresponds to a direction of looking down upon the subject from directly above.

A medium for photograph printing according to a still further aspect of the present invention is a medium to have a photograph printed thereon or a medium having a photograph printed thereon by the above-described automatic photograph vending method.

A program storage medium according to an even further aspect of the present invention is a machine-readable storage medium that stores a program for having a computer execute the above-described automatic photograph vending method.

A program according to an even further aspect of the present invention is for having a computer execute the above-described automatic photograph vending method.

BEST MODES FOR CARRYING OUT THE INVENTION

The automatic photograph sticker vending machine according to each of the embodiments of the present invention is capable of picking up an image of a subject by looking down upon the subject from directly above so that a photograph sticker of a photograph taken at an original angle can be obtained. Each of the embodiments will be described below with reference to the drawings.

First Embodiment

Figure 1:
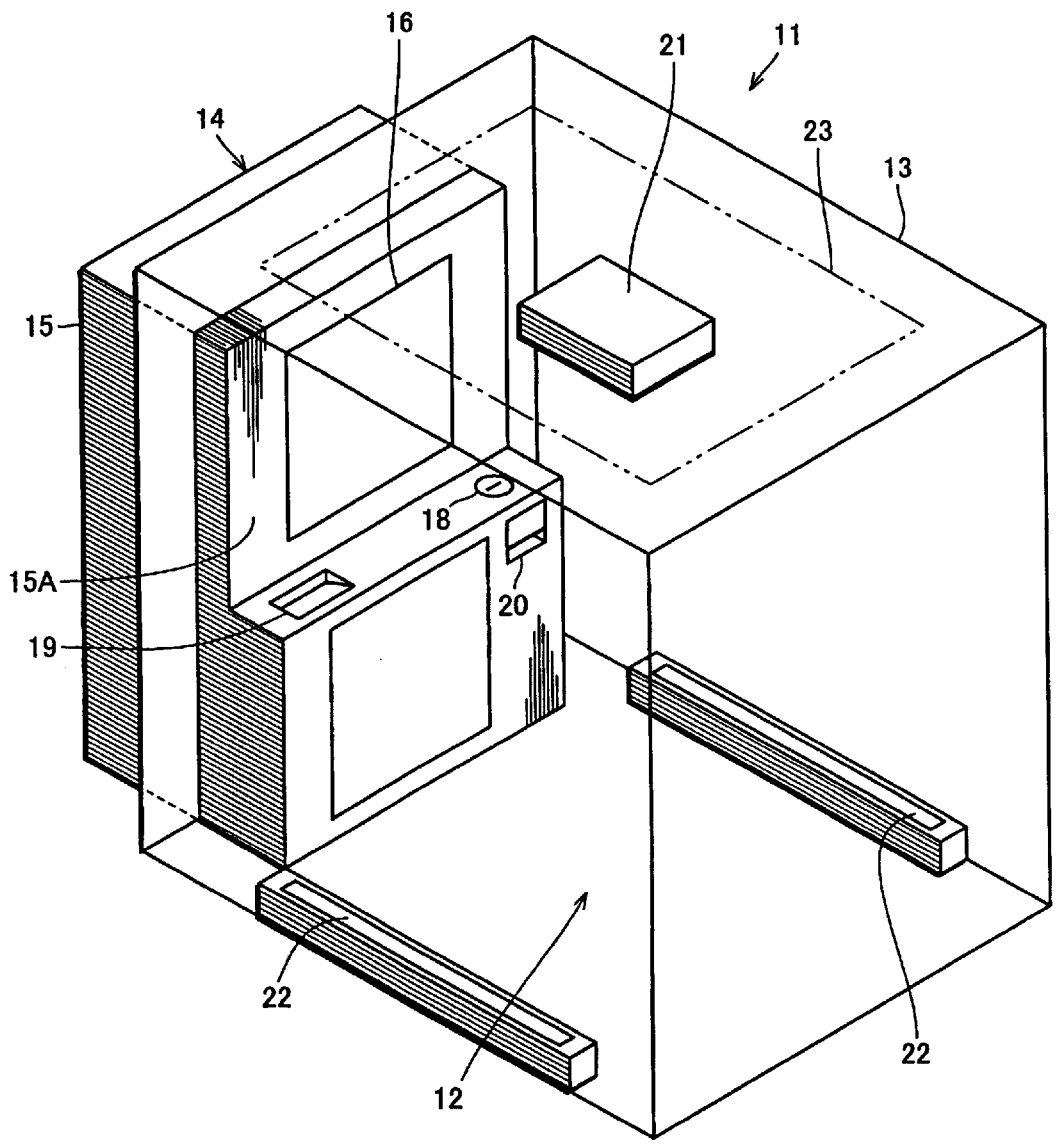
FIG. 1 is a schematic diagram of an arrangement of an automatic photograph sticker vending machine according to a first embodiment.
Figure 2:
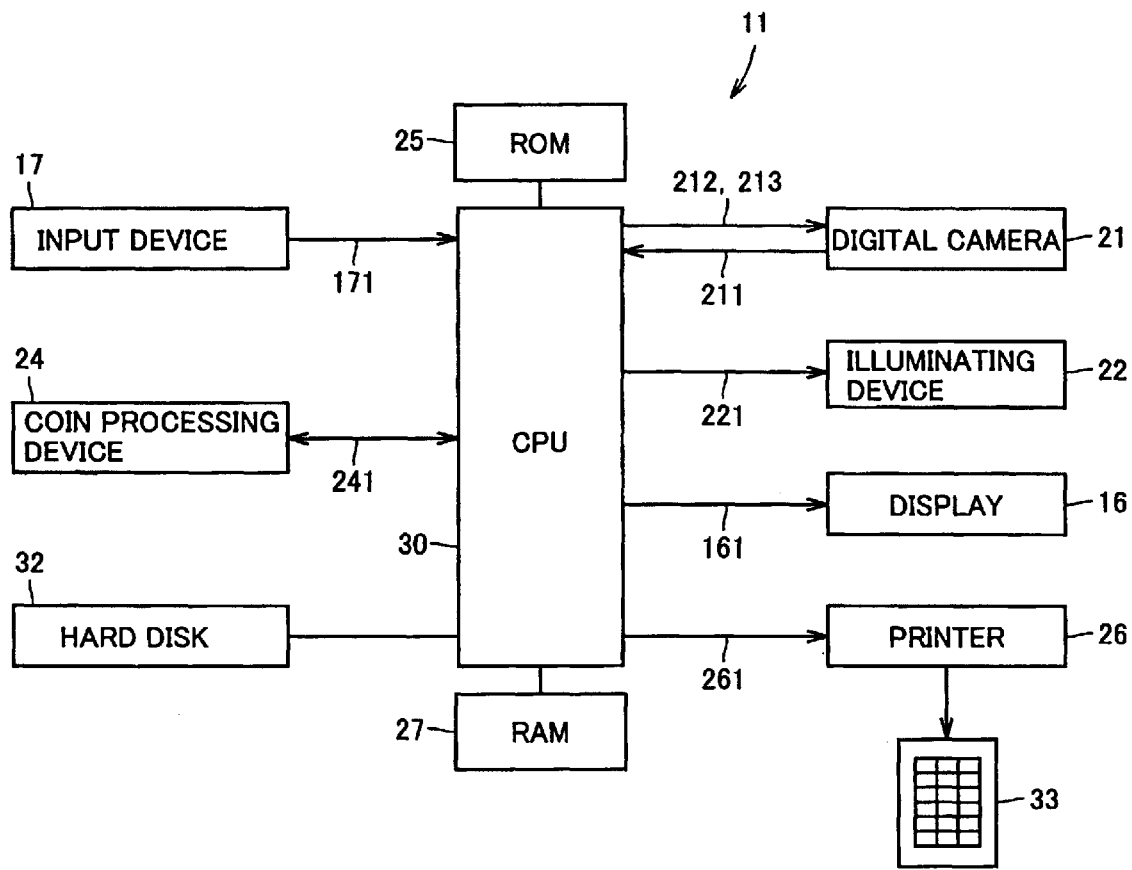
FIG. 2 is a block diagram of a control circuitry of the automatic photograph sticker vending machine in FIG. 1.

The first embodiment will be described. FIG. 1 shows a schematic arrangement of an automatic photograph sticker vending machine 11 that may be provided in an amusement facility, for instance. FIG. 2 shows a control circuitry of automatic photograph sticker vending machine 11. In FIG. 1, automatic photograph sticker vending machine 11 is provided with a frame 13 that forms an image pickup region 12 and a photograph sticker machine 14 (body of device). A housing 15 of photograph sticker machine 14 has a customer service surface 15A for receiving a customer, and customer service surface 15A is provided opposite to image pickup region 12.

In an upper center of customer service surface 15A of housing 15, a display 16 for visibly displaying various information and an image obtained by the image pickup is provided. Display 16 is formed by a CRT (Cathode Ray Tube). The various information displayed on display 16 includes a message of a manipulating procedure, an image for editing such as graffito to be superposed on the image obtained by image pickup and so on. In order to allow manipulation of inputting of information according to the image displayed on display 16, display 16 and an input device 17 (see FIG. 2) by a touch panel are integrally formed such that the touch panel is superposed on the screen. Input device 17 is provided with a switch of various kinds or a button such as a start button (not shown) manipulated to instruct image pickup (shutter manipulation).

A coin slot 18 for putting in the charge (coin) and a photograph sticker discharge outlet 19 for discharging a photograph sticker are arranged in a panel portion forming a step (or a panel portion forming a slope) in the lower portion of display 16, and a coin return outlet 20 is arranged in a vertical panel portion below coin slot 18.

At the ceiling portion formed by frame 13 of image pickup region 12, a digital camera 21, for instance, is disposed in order to pick up an image of a subject located within image pickup region 12. The ceiling portion may be formed by providing a ceiling framework to frame 13 or by providing a ceiling board. Digital camera 21 picks up an image of one person or a plural number of customers who are the subjects in image pickup region 12 set as a space for image pickup. In image pickup region 12, the one person or the plural number of customers can assume a pose. Digital camera 21 is provided with a lens for image pickup of digital camera 21 directed downward so as to pick up an image of the subject by looking down upon the subject from directly above. Mounting of digital camera 21 to the ceiling portion of image pickup region 12 is not limited to the central portion of the ceiling as shown, and it can be mounted to a position shifted to a given direction from the central portion as long as it is possible to effect image pickup of the subject within image pickup region 12 by looking down upon the subject from directly above. Thus, a customer (subject) located within image pickup region 12 only needs to turn the face toward the ceiling to allow digital camera 21 to pick up an image of the customer with the face always in the center regardless of his/her height.

An illuminating device 22 for shining light on a subject from the foot level upward to illuminate the subject is disposed at a floor portion or in a vicinity of the floor portion of image pickup region 12. As illuminating device 22, an illuminating lamp such as a fluorescent lamp and an incandescent lamp or an illuminating device with a stroboscopic lamp may be used. In addition, illuminating device 22 is provided one on either side of right and left of the floor portion in the diagram for convenience.

A mirror 23 for allowing a subject to check his/her own pose is arranged in a vicinity of digital camera 21 or at the ceiling portion such that it does not interfere with digital camera 21. Mirror 23 is arranged with its surface upon which an image is reflected being directed downward. In addition, the size and the shape of mirror 23 is not limited to those shown and it may be of the size and shape that allow the subject to check his/her own pose.

While mirror 23 is provided for checking of the pose of the subject here, it also has the function of improving the illumination effect by having the light irradiated from illuminating device 22 reflected by mirror 23. Consequently, the consumed power is reduced and the control for illumination becomes unnecessary.

Moreover, it is desirable to provide to image pickup region 12 a control portion for turning on/turning off the light of illuminating device 22. For instance, a switch and the like that turns on/turns off the light of illuminating device 22 according to the switch being manipulated to ON/OFF may serve as the control portion. Alternatively, the light of illuminating device 22 may be turned on/turned off in response to sensing a human as the subject entering into/exiting from image pickup region 12 by a sensing portion such as an infrared sensor.

Referring to FIG. 2, automatic photograph sticker vending machine 11 has a CPU 30 for managing and controlling itself centrally, previously-described display 16, input device 17, digital camera 21, and illuminating device 22, a ROM (abbreviation for read-only memory) 25 in which various programs or data are stored, a RAM (abbreviation for random access memory) 27, a coin processing device 24, a printer 26 for printing a photograph onto a sheet-like sticker, and a hard disk 32 connected to CPU 30. The sheet-like sticker (hereinafter referred to as a photograph sticker sheet) 33 having a photograph printed thereon by printer 26 is discharged from photograph sticker discharge outlet 19 to be passed close to the hand of the customer. RAM 27 further stores image data temporarily.

CPU 30 receives an input signal 171 from input device 17, communicates a processing signal 241 with coin processing device 24, receives image data (image data obtained by picking up an image of a subject) 211 inputted from digital camera 21, and outputs a zoom signal 212 for instructing a zoom operation and a shutter signal 213 to digital camera 21. Shutter signal 213 is outputted when a start button of input device 17 is manipulated to ON. In addition, CPU 30 outputs an illumination control signal 221 for controlling an illumination operation to illuminating device 22, outputs various signals 161 including an RGB signal (signal for primaries of light, i.e., Red, Green, Blue) for displaying an image and information on display 16, and outputs image data to be printed hereinafter referred to as print image data) 261 to printer 26.

CPU 30 controls the driving of digital camera 21, illuminating device 22, display 16, printer 26, and coin processing device 24 based on input signal 171, processing signal 241, and image data 211 according to a program stored in ROM 25.

Moreover, a prescribed program for causing CPU 30 to execute the automatic photograph vending method is stored in advance in hard disk 32. CPU 30 may control the driving of each portion according to the prescribed program in hard disk 32 after being started according to a program stored in ROM 25.

Coin processing device 24 is built into housing 15 of FIG. 1, and determines whether a coin is inserted into coin slot 18 and determines the authenticity and the denomination of the coin inserted, and as a result, returns the change or a false coin from return outlet 20.

Printer 26 is built into housing 15 of FIG. 1 and prints onto a sheet-like sticker the print image data 261 of the subject obtained by picking up an image with digital camera 21, and a photograph sticker sheet 33 is outputted. Printer 26 here, for instance, color-prints; however, instead of color print, it may print in monochrome such as monotone or sepia.

When shutter signal 213 provided from CPU 30 is inputted, digital camera 21 accordingly picks up an image of a subject. Illuminating device 22 is started by illumination control signal 221 from CPU 30. When, however, a stroboscopic illuminating device is used as illuminating device 22, the stroboscopic illuminating device should to be formed such that it emits light at the same time as an shutter operation of digital camera 21 by shutter signal 213. The same applies in each of the operations described below.

Display 16 has a monitor function in which it receives the inputted RGB signal obtained by CPU 30 based on image data 211 outputted from digital camera 21 and displays an image based on the RGB signal. With the monitor function, the subject can check his/her own pose in real time in a screen of display 16.

Figure 3:
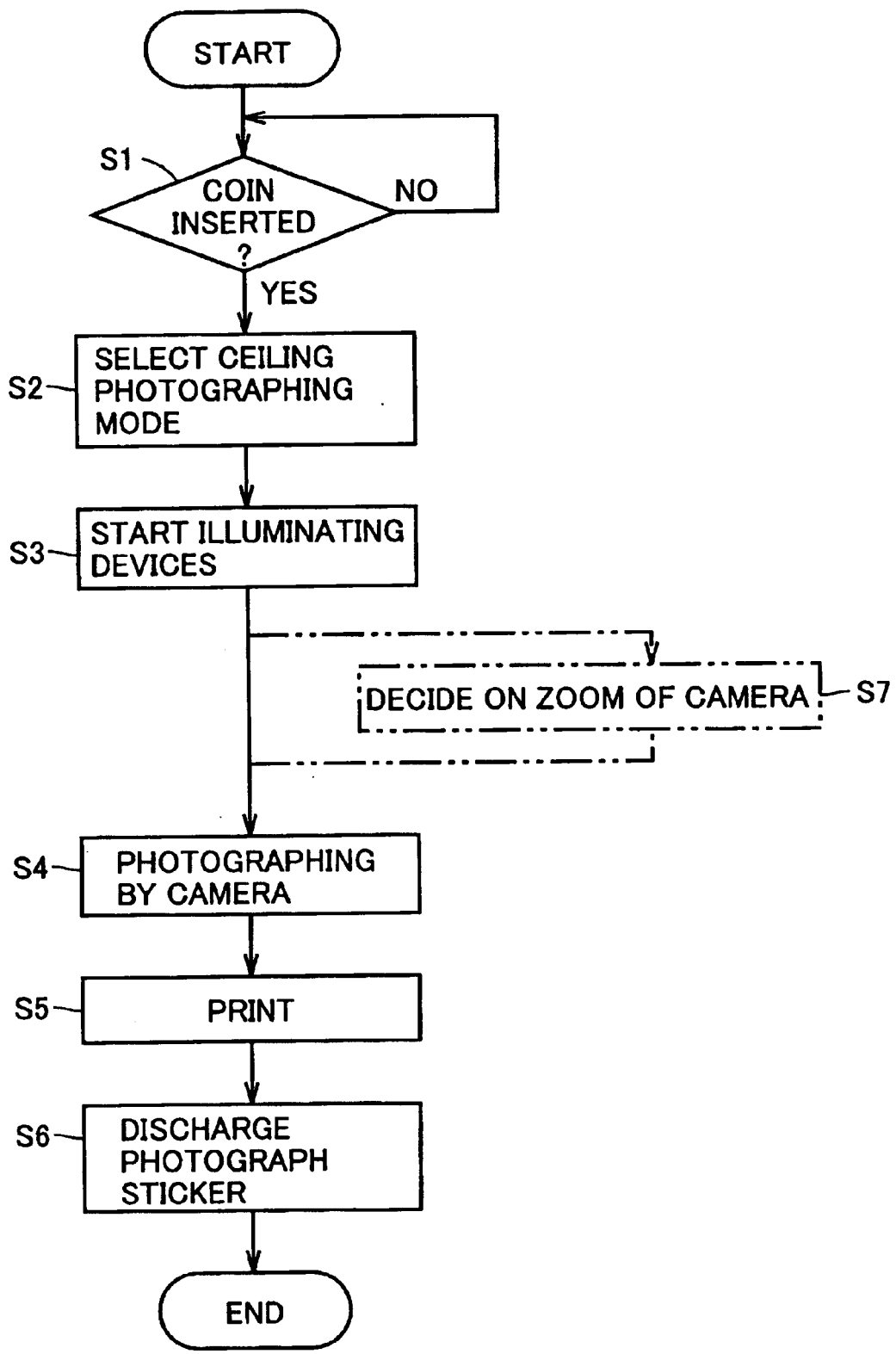
FIG. 3 is a processing flow chart showing an operation of an automatic photograph sticker vending machine according to the first and second embodiments.

An operation of automatic photograph sticker vending machine 11 will be described according to the flow chart of FIG. 3. In addition, the processing in a step S7 of FIG. 3 will be described later along with the second embodiment.

First, when one person or a plural number of customers as subjects enter into image pickup region 12 and puts in a coin from coin slot 18, processing signal 241 from coin processing device 24 is inputted to CPU 30. In step S1, CPU 30 determines whether a coin has been inserted based on the inputted processing signal 241, and a move is made to the next step S2 only when it is determined that a coin has been inserted. In step S2, CPU 30 outputs various signals 161 to display 16 to cause it to display a message of manipulating procedure and the like. With the displayed message, the subject is prompted to select a ceiling image pickup mode (an operating mode in which photographing is performed using digital camera 21 at the ceiling), and after deciding on a pose for photographing, the subject is prompted to manipulate a start button (not shown) of input device 17 to ON. When deciding on a pose, the subject can check his/her own pose with mirror 23 provided at the ceiling portion. When the start button is manipulated to ON, image pickup is instructed.

When the subject selects the ceiling image pickup mode as well as manipulates the start button to ON, the process moves to step S3. In addition, the move to step S3 may be made only by the ON manipulation of the start button without the manipulation to select the ceiling image pickup mode.

In step S3, CPU 30 outputs illumination control signal 221 to illuminating devices 22, and simultaneously starts illuminating devices 22 on the right and the left in FIG. 1. Consequently, the subject within image pickup region 12 is illuminated.

In the next step S4, CPU 30 outputs shutter signal 213 to digital camera 21 so that digital camera 21 picks up an image of the subject by looking down upon the subject from directly above. CPU 30 receives the inputted image data 211 obtained by picking up the image with digital camera 21 so that CPU 30 outputs to printer 26 print image data 261 based on image data 211 in step S5. Printer 26 receives the inputted print image data 261 and prints onto a sheet-like sticker so that photograph sticker sheet 33 of the image of the subject can be obtained.

In step 6, CPU 30 drives a carry-out device (not shown) provided inside photograph sticker discharge outlet 19, and discharges photograph sticker sheet 33 from photograph sticker discharge outlet 19.

In this manner, with automatic photograph sticker vending machine 11, an image of the subject can picked up by looking down upon the subject from directly above using digital camera 21 so that the customer can acquire a photograph sticker having printed thereon a photograph of an image picked up from an original angle and be entirely satisfied.

Illuminating device 22 is disposed at a floor portion or in a vicinity of the floor portion of image pickup region 12 so that uniform quantity of light of illumination can be ensured regardless of the magnitude of the distance between digital camera 21 and the subject due to the difference in height of the subject and so on.

Mirror 23 for allowing the subject to check his/her own pose is provided in a vicinity of digital camera 21 so that the subject can assume a desired pose more easily.

Second Embodiment

The second embodiment will be described. In the second embodiment, digital camera 21 further has a zoom function. As shown in FIG. 2, digital camera 21 receives shutter signal 213 as well as zoom signal 212 inputted from CPU 30 and performs a zoom-in or zoom-out operation based on the inputted zoom signal 212. The arrangement in other portions of automatic photograph sticker vending machine 11 is the same as that of the first embodiment so that the description thereof will not be repeated. An operation of automatic photograph sticker vending machine 11 according to the second embodiment will be described below with reference to the flow chart shown in FIG. 3.

According to the second embodiment, a step S7 is newly added between step S3 and step S4 described in the foregoing first embodiment, and a start button cannot be manipulated to ON in step S2. In step S7, CPU 30 displays on display 16 a message such as of manipulating procedure and the like. The displayed message prompts the subject to manipulate either zooming in or zooming out of digital camera 21 with input device 17 as well as to manipulate the start button of input device 17 to ON when deciding on a pose. The subject performs one of the manipulations of zooming in and zooming out according to the message via input device 17 so that an input signal 171 indicating the content of manipulation is supplied to CPU 30.

CPU 30 supplies to digital camera 21 zoom signal 212 based on input signal 171 so that digital camera 21 performs the zoom-in or zoom-out operation based on zoom signal 212 supplied. In addition, the subject manipulates the start button of input device 17 to ON when he/she decides on the pose for image pickup by checking the screen by the monitor function displayed on display 16 and an image reflected in mirror 23 so that the process moves to the next step S4. The subsequent process is the same as that described previously so that the description will not be repeated. Here, the subject can easily decide on a desired pose by checking the display screen of display 16.

In addition, a manipulating portion for switching between the zooming in and the zooming out of digital camera 21 is formed by a switch such as a rotary switch, a slide switch, or a changeover switch provided separately from input device 17, and such a switch can be provided in a range within which the subject can easily manipulate it, such as in the vicinity of digital camera 21.

In the second embodiment, digital camera 21 is provided with the zoom function so that the customer (subject) can pick up an image by enlarging/reducing the image according to his/her own height. Specifically, the customer can pick up the image with the face enlarged in enlarged image pickup or with a greater area of background secured in reduced image pickup.

Third Embodiment

Figure 4:
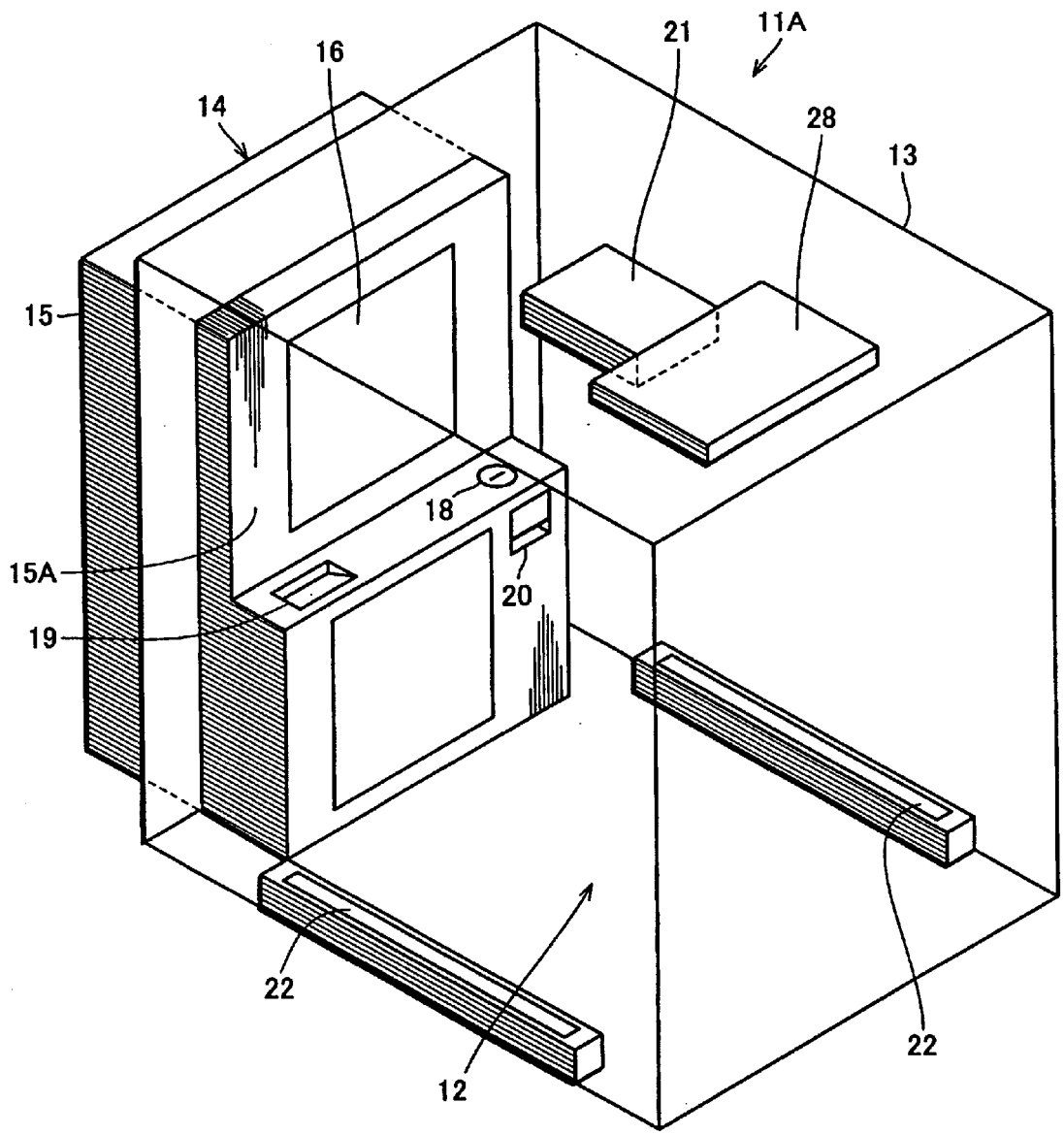
FIG. 4 is a schematic diagram of an arrangement of an automatic photograph sticker vending machine according to a third embodiment.
Figure 5:
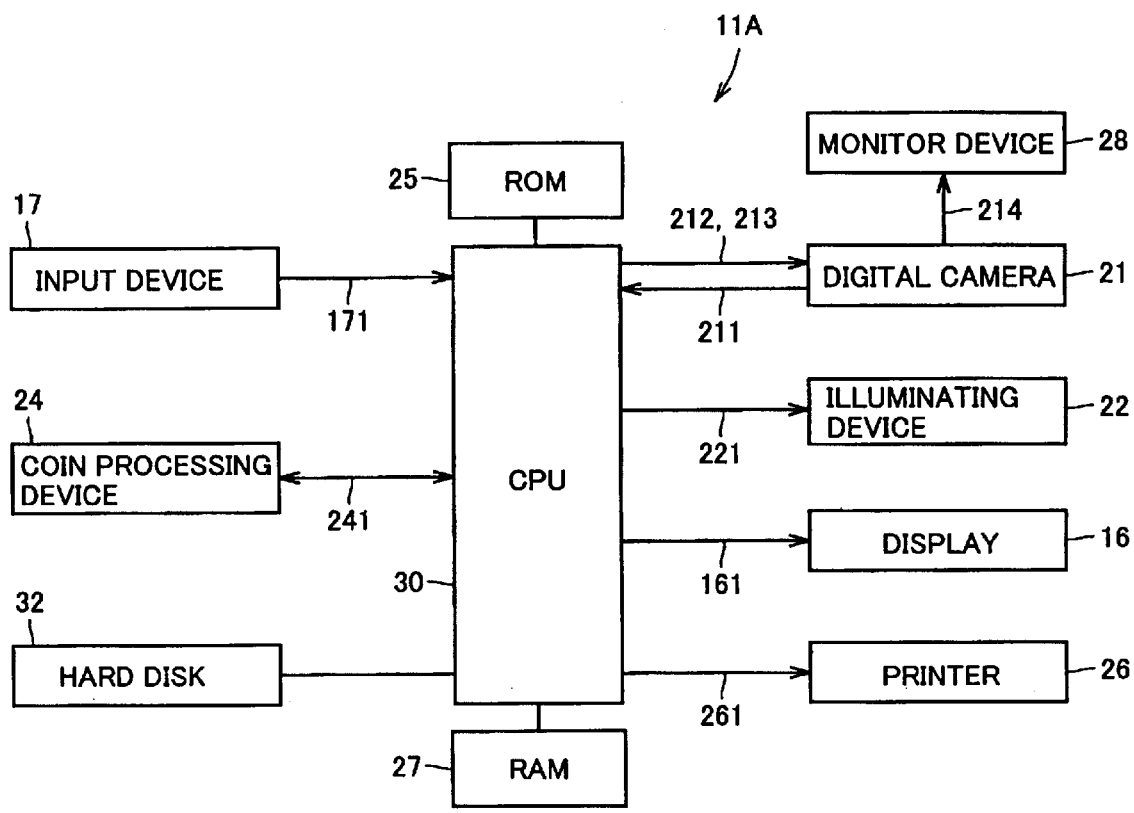
FIG. 5 is a block diagram of a control circuitry of the automatic photograph sticker vending machine according to the third embodiment.
Figure 6:
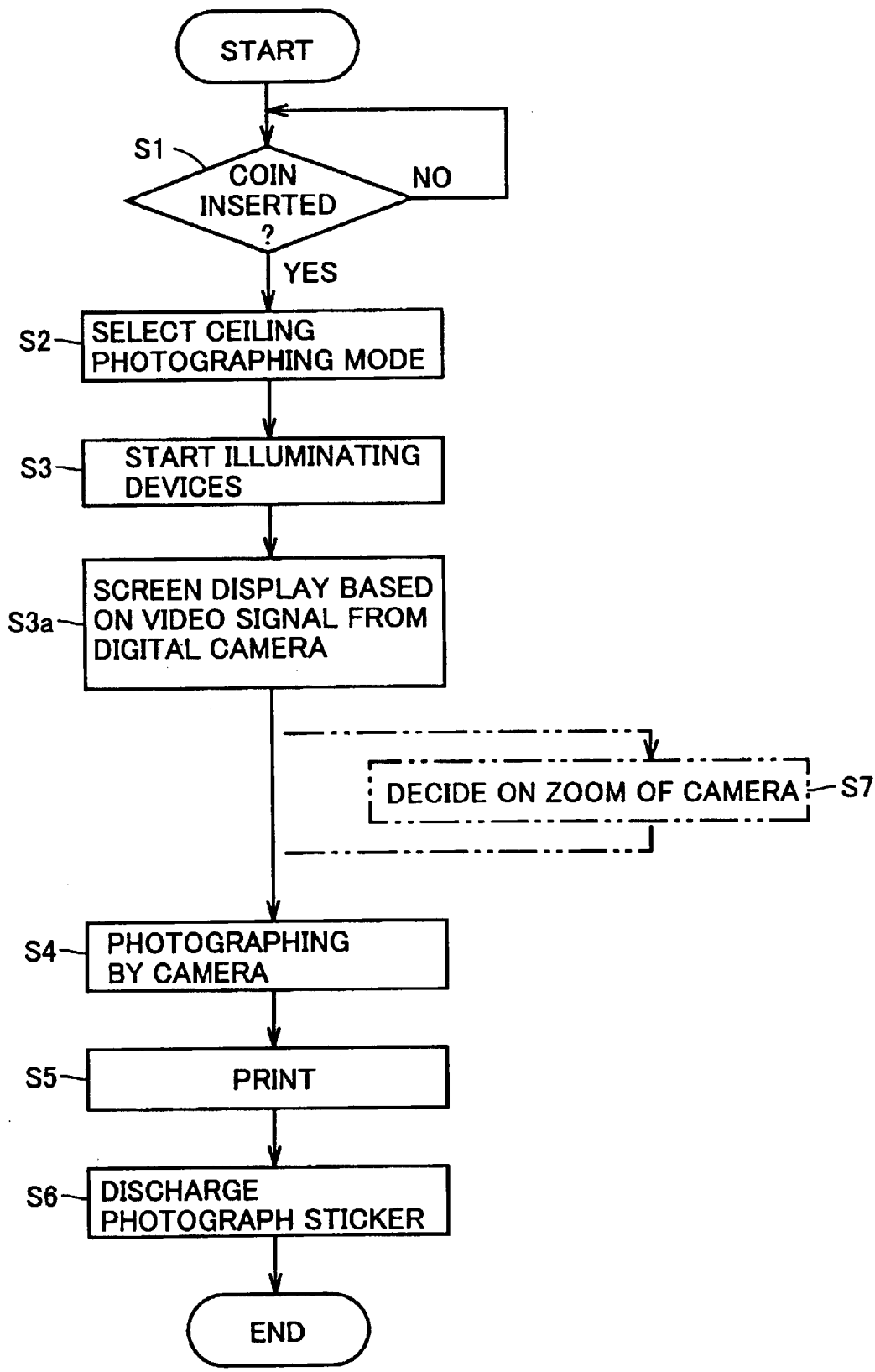
FIG. 6 is a processing flow chart showing an operation of the automatic photograph sticker vending machine according to the third embodiment.

FIGS. 4, 5, and 6 show a structure, a control circuitry block, and a processing flow chart of an automatic photograph sticker vending machine 11A. When automatic photograph sticker vending machine 11A of FIGS. 4 and 5 is compared with automatic photograph sticker vending machine 11 of FIGS. 1 and 2, the difference lies in that automatic photograph sticker vending machine 11A has a monitor device 28 in place of mirror 23. Other portions of automatic photograph sticker vending machine 11A are the same as those in FIGS. 1 and 2 so that the description thereof will not be repeated.

As shown in FIG. 4, monitor device 28 is disposed in a vicinity of digital camera 21 at the ceiling portion of image pickup region 12, with its screen directed downward. When operating in a monitor mode, monitor device 28 is supplied with a video signal 214 of image data 211 obtained by picking up an image of the subject with digital camera 21 as shown in FIG. 5 and thus displays in real time an image based on video signal 214 supplied. Consequently, the subject can decide on his/her own pose while checking the image displayed on monitor device 28.

An operation of automatic photograph sticker vending machine 11A of the third embodiment will be described according to the flow chart of FIG. 6. First, steps S1 to S3 are performed as described previously. In step S2, however, the manipulation to select a ceiling image pickup mode alone is performed, and the ON manipulation is not performed. Thereafter, a move is made to step S3a.

In step S3a, CPU 30 drives digital camera 21 in the monitor mode so that video signal 214 outputted from digital camera 21 is supplied to monitor device 28. Consequently, an image of one person or a plural number of persons who are subjects based on video signal 214 supplied is displayed on the screen of monitor device 28 so that a subject can decide on a pose while checking his/her own pose on the screen of monitor device 28. In addition, display 16 displays a message that prompts the ON manipulation of the start button of input device 17 when a pose is decided. When deciding on the pose, the subject manipulates the start button to ON according to the displayed message so that the process moves to step S4. The process subsequent to step S4 is the same as that described previously so that the description will not be repeated.

As described above, automatic photograph sticker vending machine 11A is provided with monitor device 28 for allowing the subject to check his/her own pose in the vicinity of digital camera 21 so that the customer (subject) can easily decide on the desired pose.

Digital camera 21 of automatic photograph sticker vending machine 11A may further have a zoom function. In this case, when supplied with zoom signal 212 from CPU 30, digital camera 21 also performs the zoom-in or zoom-out operation based on zoom signal 212 supplied. Specifically, the processing of step S7 is added in the flow chart of FIG. 6. The processing similar to that described previously is performed in step S7. At this time, the image of the subject zoomed in or zoomed out is displayed on the screen of monitor device 28 based on video signal 214 and on display 16 based on an RGB signal within various signals 161, respectively, so that the subject can decide on the size of the image as desired by checking the screen of monitor device 28 and the like.

Thus, since the subject manipulates the start button of input device 17 to ON according to the displayed message of display 16 when having decided on the desired pose and size of image pickup while viewing the screen, a move is made to step S4, and the processing is performed as described previously.

A manipulating portion for instructing the zooming in or the zooming out of digital camera 21 can be formed by superposing a touch panel on monitor device 28 separately from input device 17. Otherwise, the manipulating portion may be formed by a switch such as a rotary switch, a slide switch, or a changeover switch in a range within which the subject can easily manipulate it while checking himself/ herself by monitor device 28, such as in the vicinity of monitor device 28 or on a side surface of image pickup region 12. Alternatively, the manipulating portion may be formed by a wired or wireless hand-held remote manipulation device.

Automatic photograph sticker vending machine 11A described above displays a subject image on monitor device 28 simultaneously with the zoom-in or zoom-out operation of digital camera 21 so that the customer (subject) can easily decide on the desired pose and image size.

Fourth Embodiment

Figure 7:
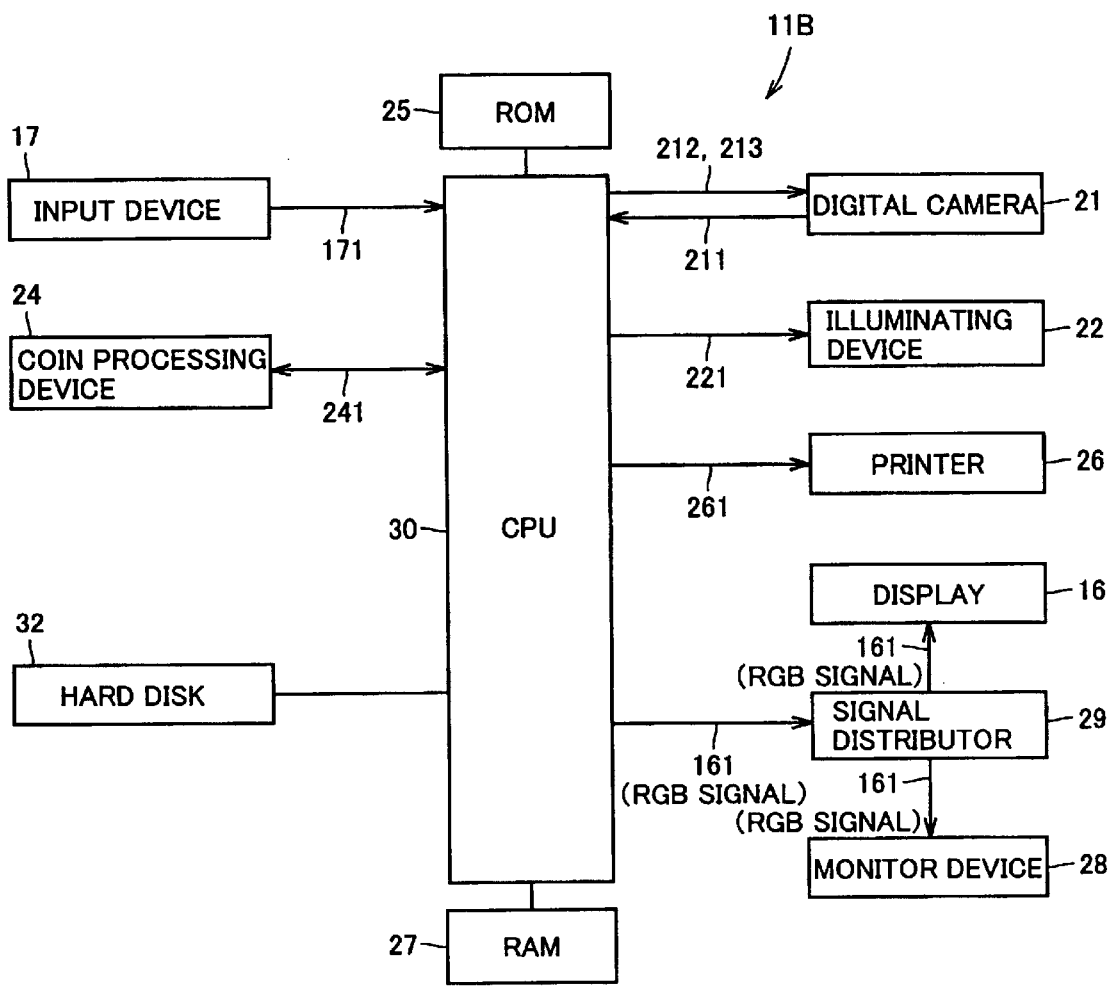
FIG. 7 is a block diagram of a control circuitry of an automatic photograph sticker vending machine according to a fourth embodiment.
Figure 8:
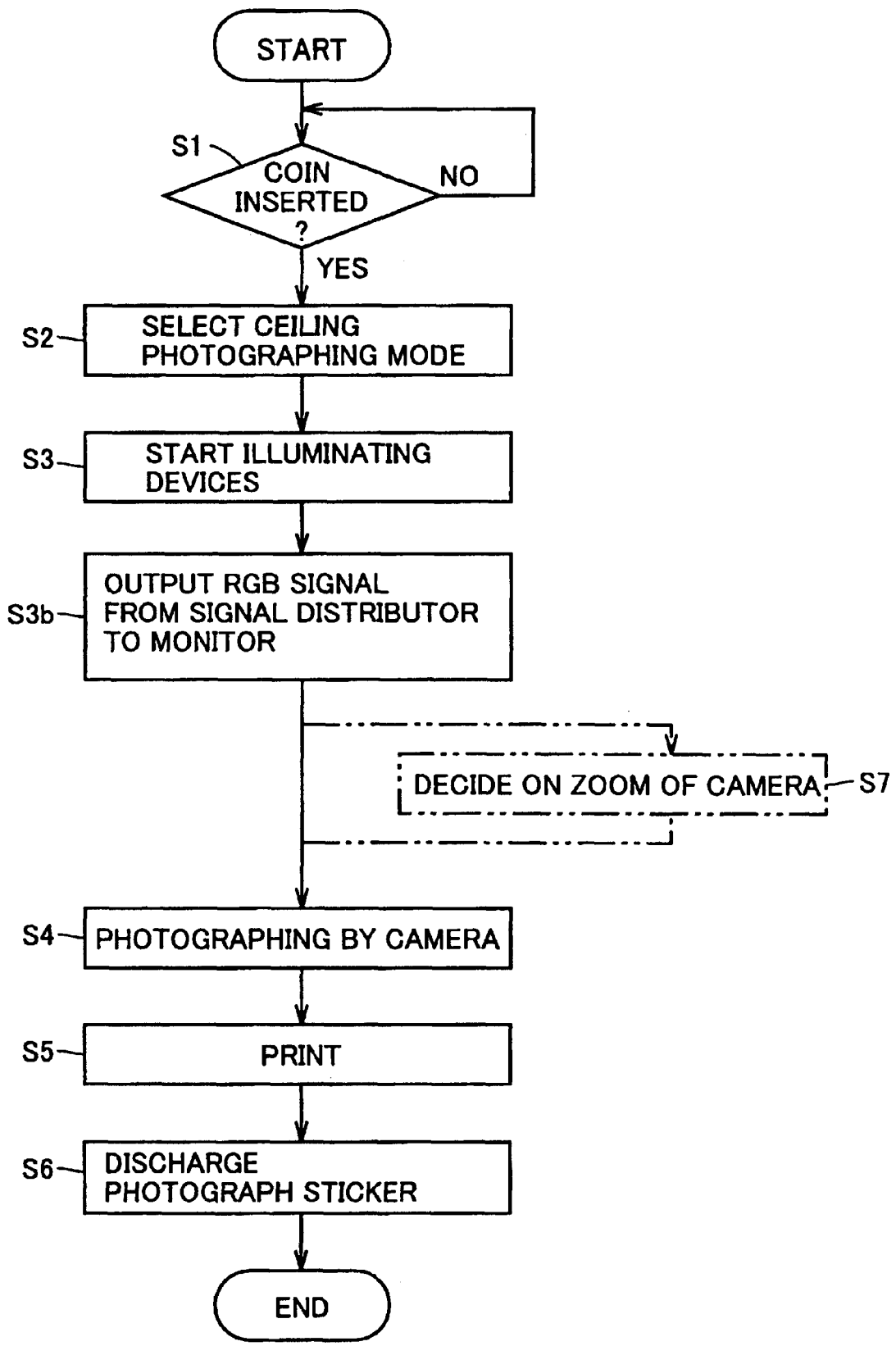
FIG. 8 is a processing flow chart showing an operation of the automatic photograph sticker vending machine according to the fourth embodiment.

FIGS. 7 and 8 are a control circuitry block diagram and a flow chart for an automatic photograph sticker vending machine 11B according to the fourth embodiment. Automatic photograph sticker vending machine 11B adopts a structure utilizing digital camera 21 at the ceiling portion and monitor device 28 provided in the vicinity of digital camera 21, as shown in FIG. 4. As shown in FIG. 7, automatic photograph sticker vending machine 11B has a signal distributor 29 in addition to the arrangement described previously. Other portions of automatic photograph sticker vending machine 11B are the same previously described so that the description thereof will not be repeated. Referring to FIG. 7, an RGB signal within various signals 161 outputted from CPU 30 is supplied to display 16 and monitor device 28 via signal distributor 29 so that monitor device 28 and display 16 respectively display an image of the subject based on the RGB signal supplied.

An operation of automatic photograph sticker vending machine 11B will be described according to the flow chart of FIG. 8. The process up to step S1 is performed as previously described, and the process moves to the next step S2. In step S2, since CPU 30 displays on display 16 a message such as of manipulating procedure and the like to prompt the subject to select the ceiling image pickup mode, the subject manipulates input device 17 to select the ceiling image pickup mode, and then, the processing of the next step S3 is performed as previously described.

Next, in step S3b, CPU 30 drives digital camera 21 in a monitor mode, converts image data 211 inputted from digital camera 21 into an RGB signal, and outputs the RGB signal to monitor device 28 and display 16 via signal distributor 29. Consequently, an image of one person or a plural number of persons who are subjects obtained by image pickup by digital camera 21 is displayed both on the screen of monitor device 28 and on display 16 so that a subject can decide on a pose while checking the image displayed on the screen of monitor device 28 or display 16. At this time, the subject is prompted with a message displayed on display 16 to manipulate the start button of input device 17 to ON when deciding on a pose so that the subject manipulates the start button to ON when having decided on the pose.

When the start button is ON manipulated, the processing of steps S4 to S6 is performed as previously described.

In this manner, monitor device 28 for allowing the subject to check his/her own pose is arranged in the vicinity of digital camera 21 is provided to automatic photograph sticker vending machine 11B of the fourth embodiment so that the subject can decide on his/her own desired pose while checking his/her own image displayed on monitor device 28.

Digital camera 21 of automatic photograph sticker vending machine 11B may have a zoom function. In this case, a step S7 is newly added between step S3b and step S4 of FIG. 8. Specifically, when an image of the subject is displayed on monitor device 28 and display 16 in step S3b, in step S7, CPU 30 displays on display 16 a message such as of manipulating procedure and the like and prompts the subject to perform one of the manipulations of zooming in and zooming out of digital camera 21. The subject performs the manipulation to effect a desired one of zooming in or zooming out via input device 17 according to the message, so that input signal 171 indicating the content of manipulation is supplied to CPU 30. CPU 30 outputs zoom signal 212 to digital camera 21 according to input signal 171 supplied, and causes digital camera 21 to perform the zoom-in or zoom-out operation. At this time, the image of the subject is displayed on each of the screen of monitor device 28 and display 16 according to the zoom-in or zoom-out operation so that the subject can check the size of his/her own image on the screen of monitor device 28 or display 16.

In this manner, when the subject checks the image displayed on the screen of monitor device 28 or on display 16 and decides on the desired pose and the desired image size, the subject manipulates the start button to ON according to the message as described previously, and thereafter, the processing of steps S4 to S6 is performed as previously described.

In this embodiment, a portion for manipulating the zooming in or the zooming out of digital camera 21 is not limited to input device 17. In other words, the portion for manipulation may be formed by superposing a touch panel on monitor device 28 in addition to input device 17 or by a switch of various kinds such as a rotary switch, a slide switch, or a changeover switch, providing it in a range within which the subject can manipulate it while checking his/her own image on the screen of monitor device 28, such as in the vicinity of monitor device 28.

Thus, when digital camera 21 has the zoom function, the subject can easily decide on the desired pose and image size by checking his/her own image displayed on monitor device 28.

Fifth Embodiment

Figure 9:
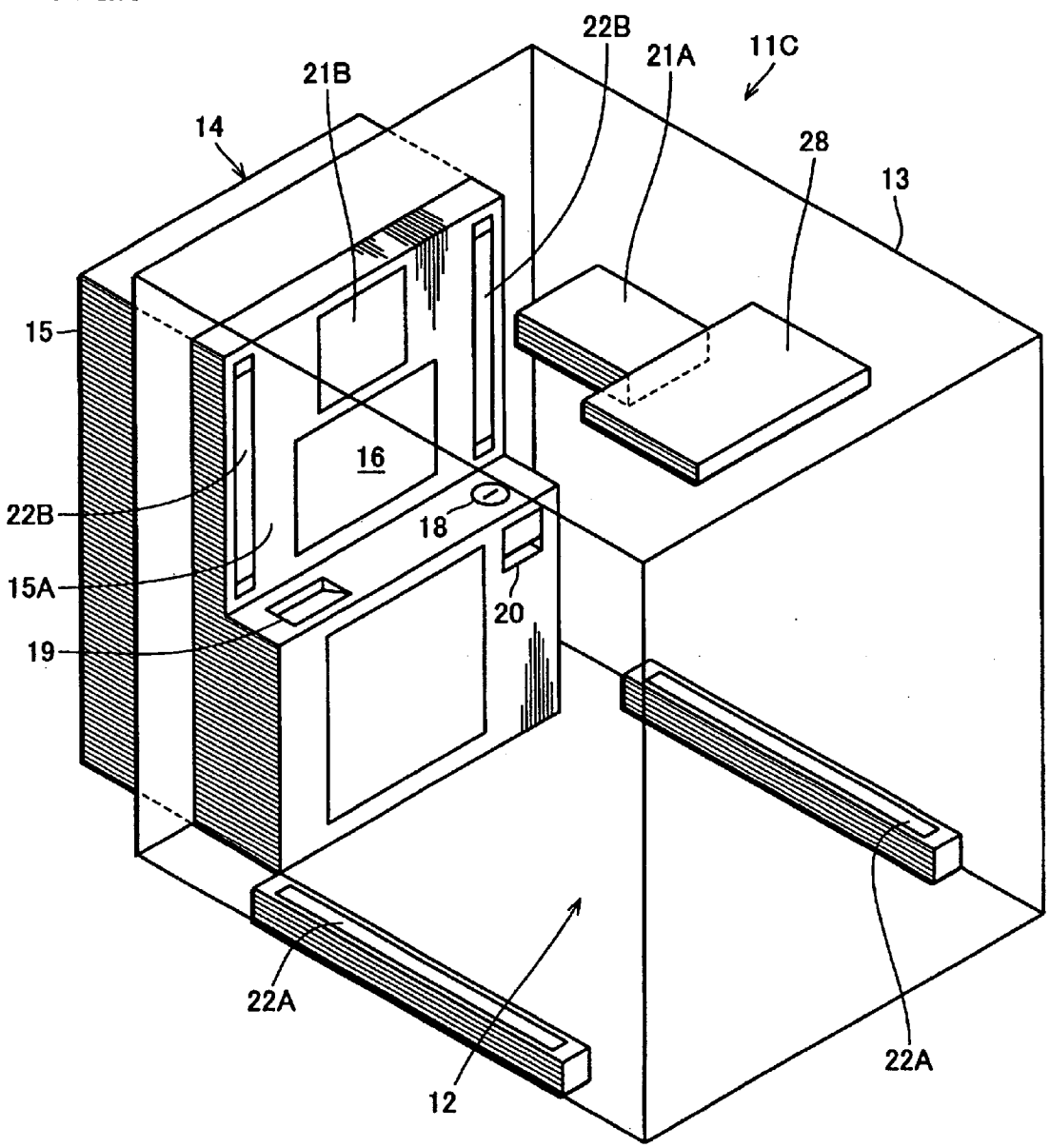
FIG. 9 is a schematic diagram of an arrangement of an automatic photograph sticker vending machine according to a fifth embodiment.
Figure 10:
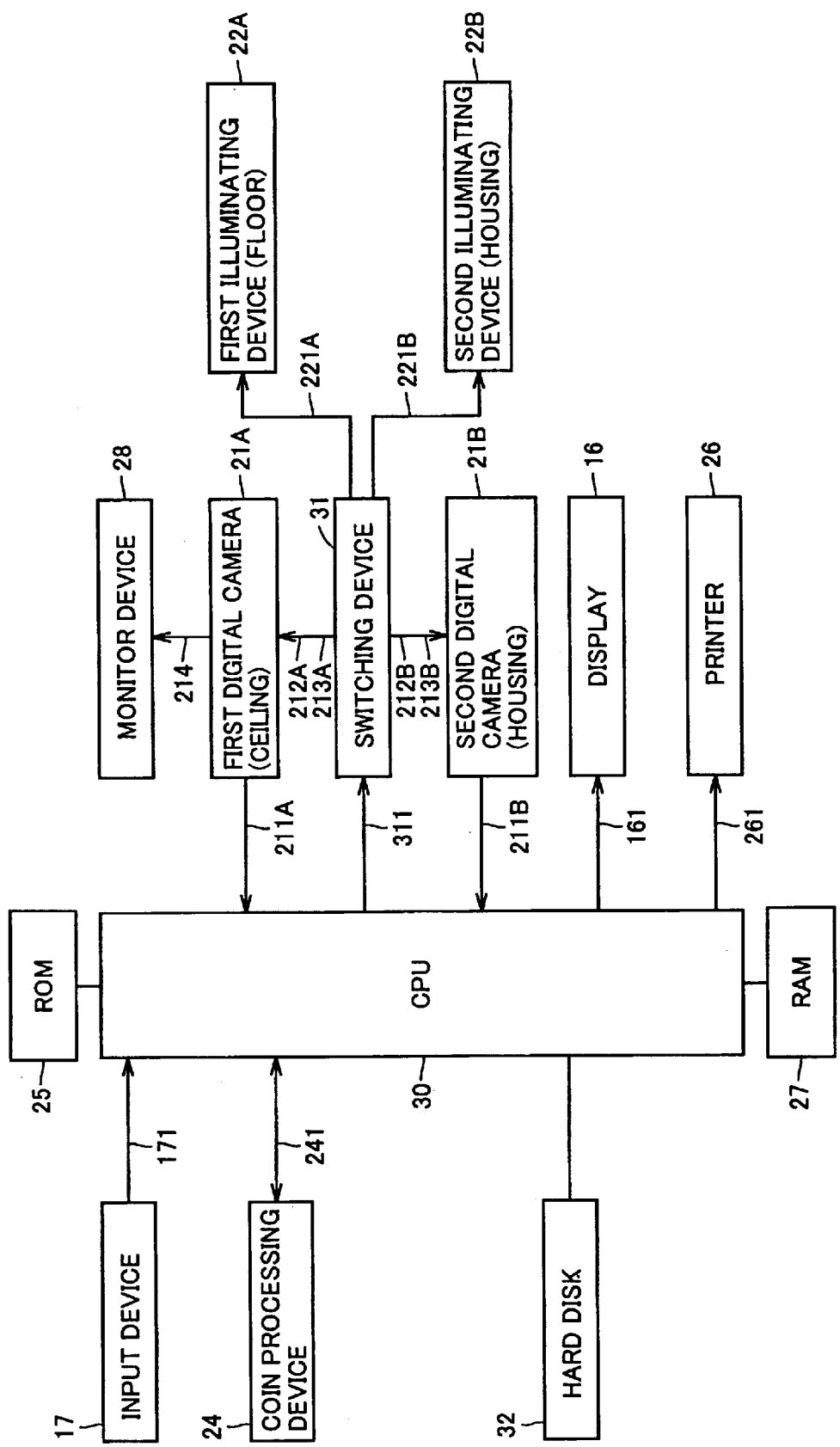
FIG. 10 is a block diagram of a control circuitry of the automatic photograph sticker vending machine according to the fifth embodiment.
Figure 11:
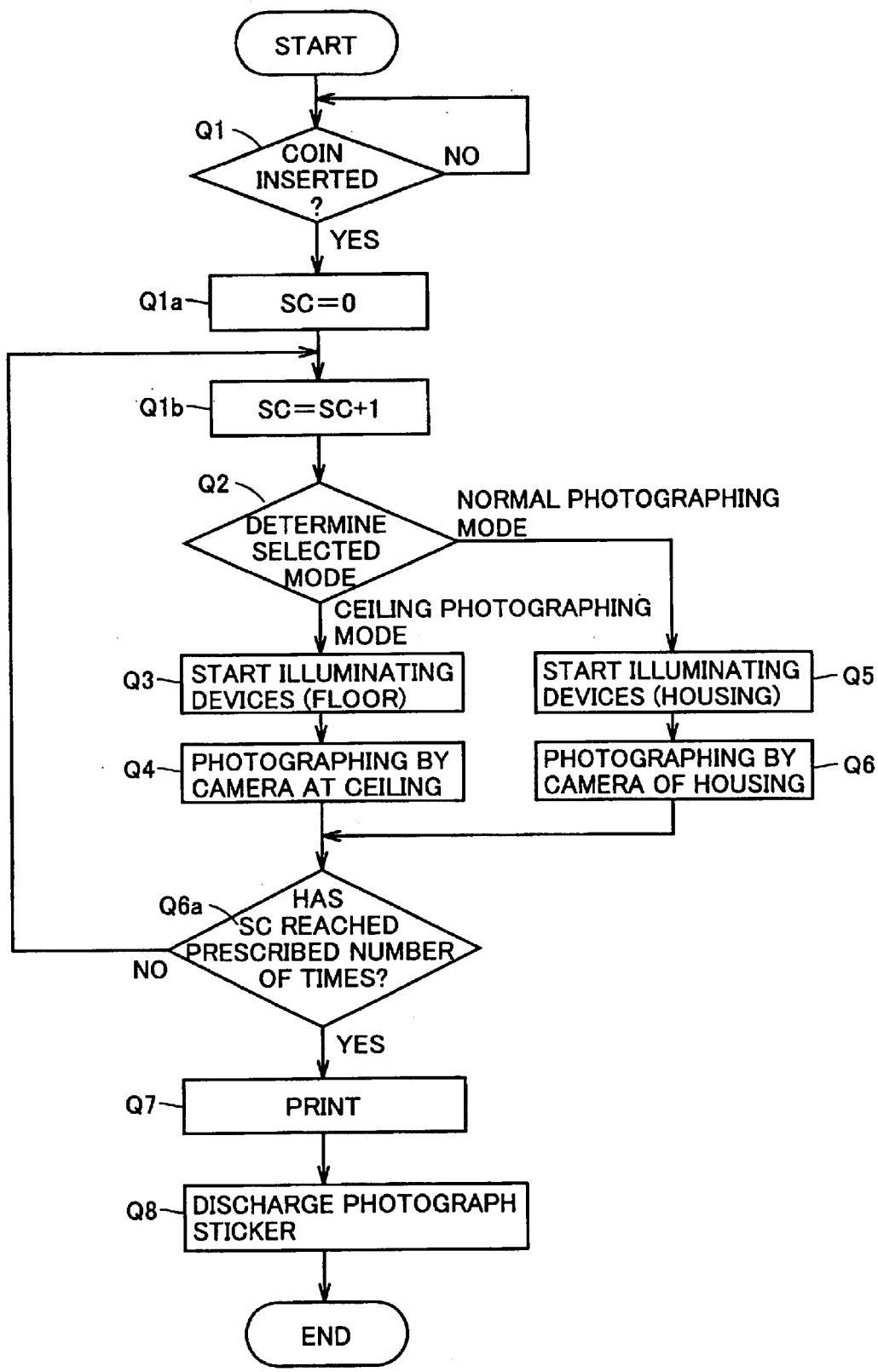
FIG. 11 is a processing flow chart showing an operation of the automatic photograph sticker vending machine according to the fifth embodiment.

FIGS. 9, 10, and 11 are a perspective view of a structure of, a control circuitry block diagram of, and a processing flow chart of an automatic photograph sticker vending machine 11C according to the fifth embodiment.

Referring to FIG. 9, automatic photograph sticker vending machine 11C is provided with a first digital camera 21A as a first image pickup portion at the ceiling portion of image pickup region 12, with its lens directed downward, and monitor device 28 for allowing a subject to check his/her own image disposed in a vicinity of first digital camera 21A. Automatic photograph sticker vending machine 11C is further provided with first illuminating devices 22A as first illuminating portions disposed on either side of right and left of a floor portion or in a vicinity of the floor portion of image pickup region 12 (for convenience of illustration, however, FIG. 9 shows the example of the floor portion) such that they oppose first digital camera 21A. Automatic photograph sticker vending machine 11C is further provided with a second digital camera 21B as a second image pickup portion in the upper portion of the upper center on customer service surface 15A of housing 15 described previously and display 16 in the lower portion thereof. Automatic photograph sticker vending machine 11C is further provided with second illuminating devices 22B as second illuminating portions that can be directed in the up-and-down direction on either side of right and left of customer service surface 15A, with second digital camera 21B and display 16 located therebetween. Other portions of automatic photograph sticker vending machine 11 of FIG. 9 are the same as those previously described so that the description thereof will not be repeated. In addition, monitor device 28 at the ceiling portion of FIG. 9 may be substituted with mirror 23.

In the present embodiment, the mode of image pickup using first digital camera 21A at the ceiling portion is referred to as a ceiling image pickup mode, and the mode of image pickup using a second digital camera is referred to as a normal image pickup mode.

Next, referring to FIG. 10, a control circuitry of automatic photograph sticker vending machine 11C will be described. Automatic photograph sticker vending machine 11C is provided with display 16, input device 17, first and second digital cameras 21A and 21B, first and second illuminating devices 22A and 22B, coin processing device 24, ROM 25, printer 26, RAM 27, monitor device 28, CPU 30, a switching device 31, and hard disk 32. First and second digital cameras 21A and 21B respectively output image data 211A and 211B to CPU 30, and respectively receive zoom signals 212A and 212B and shutter signals 213A and 213B inputted from switching device 31. First digital camera 21A outputs video signal 214 to monitor device 28.

Switching device 31 receives a selecting signal 311 inputted from CPU 30, and outputs one of zoom signal 212A (shutter signal 213A) and zoom signal 212B (shutter signal 213B) based on the inputted selecting signal 311. Consequently, switching device 31 selectively drives (activates) one of first and second digital cameras 21A and 21B with selecting signal 311. Similarly, switching device 31 receives selecting signal 311 inputted from CPU 30, and outputs one of illumination control signals 221A and 221B based on the inputted selecting signal 311. Consequently, either first illuminating devices 22A or second illuminating devices 22B are selectively driven by selecting signal 311. In this manner, switching device 31 has the function of selectively switching between digital cameras 21A and 21B based on the manipulation of input device 17 and of selectively switching between illuminating devices 22A and 22B.

With selecting signal 311 (including one of a ceiling image pickup mode selecting signal and a normal image pickup mode selecting signal) from CPU 30, switching device 31 switches between a first manner in which first digital camera 21A and the corresponding first illuminating devices 22A on the floor side are selectively driven and a second manner in which second digital camera 21B on housing 15 side and the corresponding second illuminating devices 22B on housing 15 side are selectively driven. Consequently, when the ceiling image pickup mode is selected, image data 211A is obtained by picking up an image of a subject from directly above with first digital camera 21A, while when the normal image pickup mode is selected, image data 211B is obtained by picking up an image of the subject from a direction other than from directly above, for instance, from the front of the subject, from a direction diagonally upward relative to the subject, or from a direction diagonally downward relative to the subject (hereinafter, referred to as a normal angle), with second digital camera 21B.

Moreover, the arrangement in other portions of automatic photograph sticker vending machine 11C of FIG. 10 is the same as that shown in preceding embodiments so that the description thereof will not be repeated.

An operation of automatic photograph sticker vending machine 11C will be described according to the flow chart of FIG. 11. As shown in FIG. 11, a customer who is the subject can repeat for a prescribed number of times the operation of image pickup by selecting one of the ceiling image pickup mode and the normal image pickup mode, so that a variable SC is used for counting the number of times the selection is made.

First, when one person or a plural number of customers who are the subjects enter into image pickup region 12 shown in FIG. 9 and drop in a coin into coin slot 18, processing signal 241 is supplied from coin processing device 24 to CPU 30 and a processing similar to that of step S1 previously described is performed in a step Q1. Thereafter, CPU 30 resets variable SC by setting it to 0 in a step Q1a, and increments variable SC by one in a step Q1b so as to count the selection of the current mode, and a move is made to a step Q2.

In step Q2, CPU 30 displays on display 16 a message such as of manipulating procedure and the like to prompt the subject to select one of the ceiling image pickup mode and the normal image pickup mode by manipulating input device 17. Upon such mode selection, both the image of the subject based on image data 211A outputted from first digital camera 21A at the ceiling and the image of the subject based on image data 211B outputted from second digital camera 21B of housing 15 may be displayed on display 16 to prompt the mode selection. The customer checks the message or his/her own image displayed on display 16 and selects a desired mode based on the checked result. Input signal 171 indicating the result of selection outputted from input device 17 is supplied to CPU 30. When CPU 30, based on input signal 171 supplied, determines that the ceiling image pickup mode is selected, the process moves to a step Q3, whereas when CPU 30 determines that the normal image pickup mode is selected, the process moves to a step Q5.

First, in step Q3 that corresponds to the first manner, CPU 30 supplies selecting signal 311 indicating the selection of the ceiling image pickup mode to switching device 31 so that switching device 31 outputs illumination control signal 221A based on selecting signal 311 supplied. Consequently, the respective first illuminating devices 22A on the left and the right provided at a floor portion (or in the vicinity of the floor portion) shown in FIG. 9 start simultaneously, and irradiate light on the subject within image pickup region 12 from the foot level upward.

In step Q3, CPU 30 drives first digital camera 21A in the monitor mode so that video signal 214 from first digital camera 21A is supplied to monitor device 28. Consequently, an image obtained by image pickup of one person or a plural number of persons who are subjects from directly above is displayed on the screen of monitor device 28 based on video signal 214 supplied, so that a subject can decide on a pose while checking his/her own image on the screen of monitor device 28. Display 16 displays a message that prompts the ON manipulation of the start button of input device 17 when the pose is decided. When deciding on the pose, a customer manipulates the start button to ON according to the displayed message so that the process moves to the next step Q4.

Although, here, the image obtained when first digital camera 21A is driven in the monitor mode is displayed only on monitor device 28, it may also be displayed on display 16.

In step Q4, when input signal 171 indicating that the start button has been manipulated to ON is supplied, CPU 30 outputs shutter signal 213A to first digital camera 21A via switching device 31 using selecting signal 311 so that first digital camera 21A accordingly picks up an image of the subject by looking down upon the subject from directly above and outputs image data 211A.

In step Q5 that corresponds to the second manner, CPU 30 supplies selecting signal 311 indicating the selection of the normal image pickup mode to switching device 31 so that switching device 31 outputs illumination control signal 221B based on selecting signal 311 supplied. Consequently, the respective second illuminating devices 22B shown in FIG. 9 start simultaneously and irradiate light from the front of the subject within image pickup region 12.

In step Q5, CPU 30 drives second digital camera 21B in the monitor mode so that CPU 30 receives image data 211B inputted from digital camera 21B and outputs to display 16 various signals 161 including an RGB signal based on image data 211B inputted. Consequently, an image obtained by image pickup of one person or a plural number of persons who are subjects from a normal angle is displayed on display 16 based on the RGB signal supplied. A subject can decide on his/her own pose by checking the image displayed on display 16. At this time, when the pose is decided, a message that prompts the ON manipulation of the start button of input device 17 is displayed on display 16 based on various signals 161 supplied so that the subject manipulates the start button to ON when having decided on the pose.

In this step Q6, when input signal 171 indicating that the start button has been manipulated to ON is supplied, CPU 30 outputs shutter signal 213B to second digital camera 21B via switching device 31 using selecting signal 311 so that second digital camera 21B accordingly picks up an image of the subject from a normal angle and outputs image data 211B.

CPU 30 temporarily stores in RAM 27 image data 211A or 211B supplied by image pickup in the first manner or the second manner as described above. Thereafter, a move is made to a step Q6a.

In step Q6a, CPU 30 determines whether the value of variable SC has reached a prescribed number of times or not. As a result of the determination, if the value has reached the prescribed number of times, image pickup of the prescribed number of times has been completed so that a move is made to a step Q7. If the value has not yet reached the prescribed number of times, a return is made to the processing of step Q1b, and the subsequent processing is repeated in a similar manner. Thus, when the image pickup of the prescribed number of times is completed, RAM 27 stores image data (211A or 211B) corresponding to the prescribed number of times of image pickup.

In step Q7, CPU 30 reads image data (211A or 211B) for the prescribed number of times of image pickup from RAM 27 and supplies the data as print image data 261 to printer 26. Printer 26 prints onto a sheet-like sticker a photograph of the supplied print image data 261. Consequently, photograph sticker print 33 is obtained. In a step Q8, CPU 30 drives a carry-out device provided inside photograph sticker discharge outlet 19, and discharges from photograph sticker discharge outlet 19 photograph sticker sheet 33 obtained in printer 26. Thus, a customer who is the subject can acquire photograph sticker sheet 33 having a photograph of himself/herself printed thereon.

In this manner, automatic photograph sticker vending machine 11C switches to a desired one of the first manner in which image pickup is performed using first digital camera 21A and first illuminating devices 22A and the second manner in which image pickup is performed using second digital camera 21B and second illuminating devices 22B according to the content of manipulation by the customer (subject). As a result, an appropriate image pickup condition can be ensured regardless of the selected manner, and the customer can choose, according to his/her desire, one of the image pickup by a normal angle and the image pickup by an angle from directly above.

First and second digital cameras 21A and 21B of automatic photograph sticker vending machine 11C according to this embodiment may have a zoom function. In this case, as shown in FIG. 10, shutter signal 213A and zoom signal 212A are supplied to first digital camera 21A and shutter signal 213B and zoom signal 212B are supplied to second digital camera 21B from switching device 31.

Figure 12:
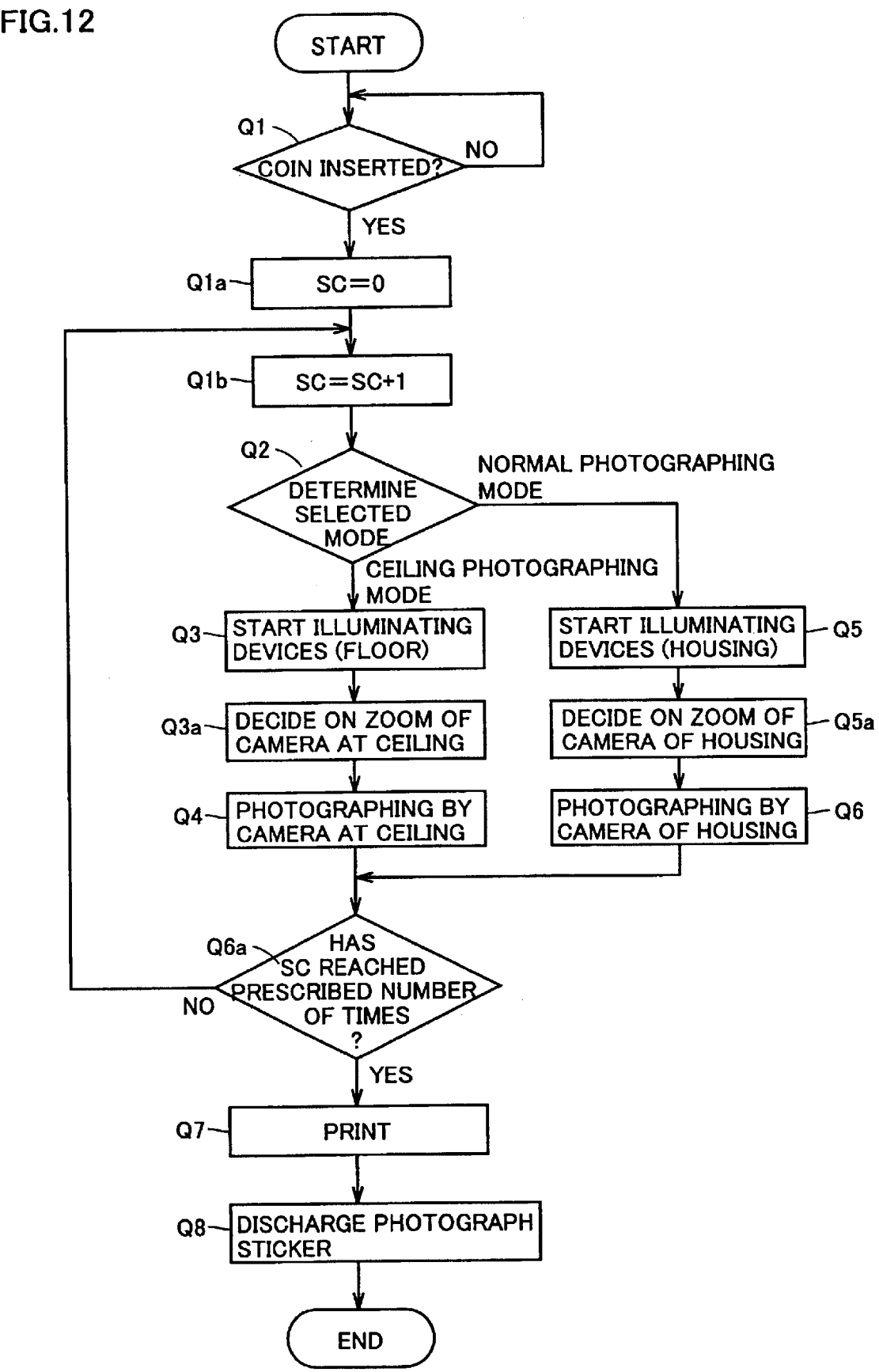
FIG. 12 is a processing flow chart showing another operation of the automatic photograph sticker vending machine according to the fifth embodiment.

An operation of automatic photograph sticker vending machine 11C provided with first and second digital cameras 21A and 21B having the zoom function will be described with reference to the flow chart of FIG. 12.

In a similar manner to that previously described, the processing of steps Q1 to Q2 is performed. When the ceiling image pickup mode is selected in step S2 and a move is made to step Q3 that corresponds to the first manner, both first illuminating devices 22A are started simultaneously as described previously and illuminate a subject within image pickup region 12.

In step Q3, CPU 30 drives first digital camera 21A in the monitor mode so that an image of the subject according to video signal 214 outputted from first digital camera 21A is displayed on the screen of monitor device 28 as described previously.

In the next step Q4, CPU 30 displays on display 16 a message such as of manipulating procedure and the like and prompts the subject to perform the manipulation of zooming in or zooming out of first digital camera 21A using input device 17. The subject performs the zoom-in or zoom-out manipulation via input device 17 according to the message so that input signal 171 indicating the content of manipulation is supplied to CPU 30. CPU 30 outputs selecting signal 311 based on input signal 171 supplied so that zoom signal 212A with a content (content indicating one of zooming in and zooming out) according to selecting signal 311 is outputted from switching device 31 to first digital camera 21A. Consequently, first digital camera 21A performs a zoom-in or zoom-out operation according to zoom signal 212A supplied. When zoom signal 212A is outputted, an image of the subject displayed on monitor device 28 based on video signal 214 and an image of the subject displayed on display 16 are also zoomed in or zoomed out. The subject can easily decide on a desired image size by performing the zoom-in or zoom-out manipulation while checking his/her own image displayed on monitor device 28 or his/her own image displayed on display 16.

In addition, a manipulating portion for manipulating the zooming in or the zooming out of first digital camera 21A is not limited to input device 17. For instance, in addition to input device 17, the manipulating portion may be formed by superposing a touch panel on monitor device 28, or by a switch of various kinds such as a rotary switch, a slide switch, or a changeover switch, providing it in a range within which the subject can manipulate it while checking his/her own image by monitor device 28, such as in the vicinity of monitor device 28.

When having decided on the image size and the pose in this manner, the subject manipulates the start button of input device 17 to ON according to the displayed message so that the processing subsequent to step Q4 is performed as described previously.

Next, the case will be described where a move is made to step Q5 that corresponds to the second manner. In step Q5, both second illuminating devices 22B are started simultaneously as previously described and irradiate light on the subject within image pickup region 12.

In step Q6, CPU 30 drives second digital camera 21B in the monitor mode, converts image data 211B from digital camera 21B into an RGB signal, and outputs various signals 161 including the RGB signal to display 16. Consequently, an image according to the RGB signal of one person or a plural number of persons who are subjects would be displayed on display 16 so that a subject can decide on a desired pose while checking the image displayed on display 16.

Next, in a step Q5a, CPU 30 displays on display 16 a message such as of manipulating procedure and the like and prompts the subject to perform the manipulation of zooming in or zooming out of digital camera 21B using input device 17. When the subject performs one of the operations of zooming in or zooming out according to the message, input signal 171 indicating the content of manipulation is supplied to CPU 30 so that CPU 30 supplies selecting signal 311 according to the supplied input signal 171 to switching device 31. Switching device 31 outputs to second digital camera 21B zoom signal 212B according to selecting signal 311 supplied so that second digital camera 21B performs a zoom-in or zoom-out operation according to zoom signal 212B supplied. Thus, at this time, an image of the subject displayed according to the RGB signal in various signals 161 is also displayed zoomed in or zoomed out on display 16. The subject can easily decide on his/her desired image size by manipulating input device 17 while checking the image displayed on display 16.

A manipulating portion for manipulating the zooming in or the zooming out of digital camera 21B is not limited to input device 17. In other words, it may be formed by a switch of various kinds such as a rotary switch, a slide switch, or a changeover switch, providing it in a range within which the subject can manipulate it while checking his/her own image on display 16, such as in the vicinity of display 16.

As described above, when having decided on his/her own desired pose and image size, the subject manipulates the start button of input device 17 to ON according to the message displayed on display 16 so that the processing subsequent to step Q6 is repeated in a similar manner.

Figure 13:
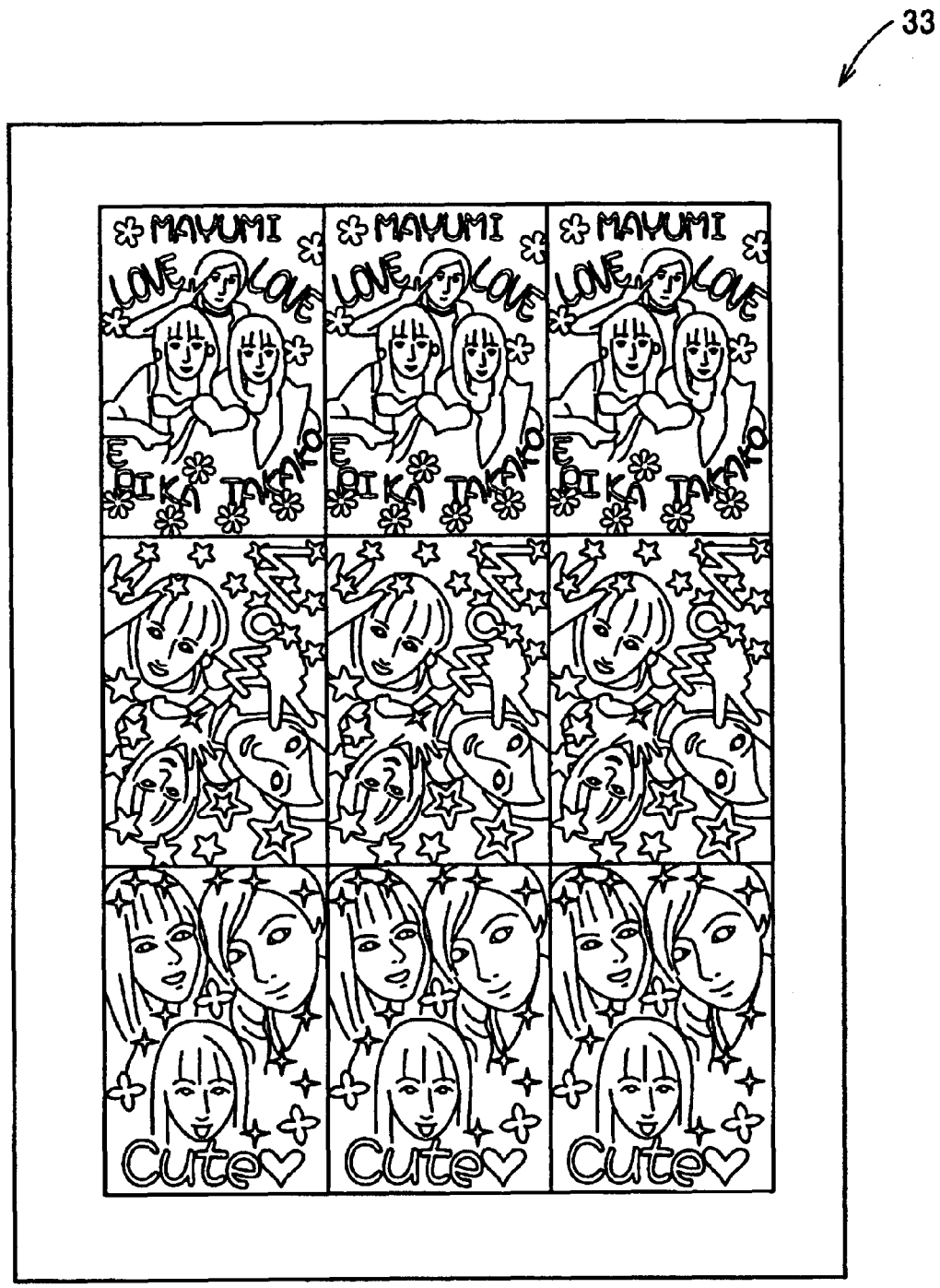
FIG. 13 is a diagram representing an example of a photograph sticker sheet that is outputted according to the fifth embodiment.

An example of photograph sticker sheet 33 that is outputted according to this embodiment is shown in FIG. 13. As shown, photograph sticker sheet 33 has printed thereon a plurality of photographs of print image data 261 in the case where the ceiling image pickup mode and the normal image pickup mode are mixed. Thus, the customer may enjoy at the same time both the photograph taken from directly above by the ceiling image pickup mode and the photograph taken from a normal angle (for instance, from the front) by the normal image pickup mode. Needless to say, the image pickup operation may be limited to only one of the modes.

In each of the above-described embodiments, an image of the subject can be picked up from directly above so that the image pickup can be performed with certainty with the face in the center regardless of the height of the subject. In addition, even when the subjects are a plural number of persons and their respective height varies, the image pickup can be performed with certainty with the face of each person in the center. As a result, a high degree of satisfaction may be provided to the customer who is to become the subject.

In each of the above-described embodiments, image pickup may be performed successively for a prescribed number of times in the same image pickup mode, such as for four times or six times, as the customer desires. The customer may arbitrarily decide this prescribed number of times of image pickup.

In each of the above-described embodiments, prior to the image pickup, the customer may be allowed to designate a pattern to be drawn in a surrounding margin or in a background of a photograph, a character or a diagram drawn over the image of the photograph and so on by manipulating input device 17. In this way, an even more enjoyable photograph sticker as one shown in FIG. 13 can be produced.

Although, in each of the above-described embodiments, the medium onto which is printed a photograph of an image obtained by image pickup is sheet-like sticker paper, the medium is not so limited.

In each of the above-described embodiments, formation of a shade due to reflection of light may be prevented by utilizing white cloth or the like (reflection member) that is the same or almost the same as a member forming a reflection board in at least a part of the portion surrounding and enclosing image pickup region 12.

Sixth Embodiment

A program or data for having CPU 30 execute a series of procedure steps for controlling an operation of automatic photograph sticker vending machine 11 (11A, 11B, 11C) itself including the procedure indicated in the flow charts shown in each of the above-described embodiments is stored in a storage medium and provided. The storage medium may be formed by hard disk 32 inside the automatic photograph sticker vending machine or by an external storage medium, not shown, such as a CD (Compact Disk), a DVD (Digital Versatile Disk), an FD (Flexible Disk), an MO Magneto Optical Disk), a Zip, a removable hard disk, and an IC card. When it is formed by an external storage medium, the automatic photograph sticker vending machine is provided with a storage medium drive (not shown) to which the external storage medium is removably mounted and which makes the program or data stored in the mounted external storage medium accessible by CPU 30. The program or data read from the external storage medium mounted on the storage medium drive is installed in a prescribed region of RAM 27 and the like and then executed by CPU 30, or is read and executed directly by CPU 30.

The above-described program or data may be downloaded and supplied to the prescribed region of RAM 27 and the like from outside via a communication line of various kinds such as the Internet. In this case, it is assumed that the automatic photograph sticker vending machine has a function, such as a modem, for achieving connection with the communication line.

Although the present invention is described in detail above with reference to the drawings, the above description is by way of example only and do not limit the present invention in any way. The content and the scope of the present invention are limited only by the attached claims.

What is claimed is:

1. An automatic photograph vending machine for selling a photograph of a subject, comprising:

an image pickup means for picking up an image of said subject in an image pickup region, set as a space for image pickup, to output image data of a subject image; and a printout means for printing onto a medium said photograph of said subject according to said image data outputted by said image pickup means, wherein said image pickup means is provided at a ceiling portion of said image pickup region and a direction of image pickup corresponds to a direction of looking down upon said subject from directly above.

2. The automatic photograph vending machine according to claim 1, further comprising an illuminating means for illuminating said subject upward from below.

3. The automatic photograph vending machine according to claim 1, further comprising, in a vicinity of said image pickup means, a pose check means for allowing said subject to check his/her own pose.

4. The automatic photograph vending machine according to claim 1, 2, or 3, wherein said image pickup means has magnification adjustment means for adjusting magnification of said subject image.

5. The automatic photograph vending machine according to claim 3, wherein said image pickup means has magnification adjustment means for adjusting magnification of said subject image, and said pose check means has a monitor means for displaying an image according to said image data outputted by said image pickup means.

6. An automatic photograph vending machine for selling a photograph of a subject, comprising:

an image pickup means for picking up an image of said subject in an image pickup region, set as a space for image pickup, to output image data of a subject image;

an input means adapted to be externally manipulated for inputting information; and a printout means for printing onto a medium said photograph of said subject according to said image data outputted by said image pickup means, wherein said image pickup means has a first image pickup portion which is provided at a ceiling portion of said image pickup region and whose direction of image pickup corresponds to a direction of looking down upon said subject from directly above, and a second image pickup portion which is provided at a side portion of said image pickup region and whose direction of image pickup corresponds to a direction different from said direction of looking down from directly above, and one of said first image pickup portion and said second image pickup portion is capable of being activated based on said information inputted by said input means.

7. The automatic photograph vending machine according to claim 6, further comprising:

illuminating means having a first illumination state in which said subject is illuminated for image pickup by said first image pickup portion and a second illumination state in which said subject is illuminated for image pickup by said second image pickup portion; and a switching means for activating one of said first image pickup portion and said second image pickup portion based on said information inputted by said input means, and setting said illuminating means to one of said first illumination sate and said second illumination state.

8. The automatic photograph vending machine according to claim 6, wherein, said illuminating means has a floor illuminating means disposed in a vicinity of a floor portion of said image pickup region, and a side illuminating means provided on a side portion of said image pickup region, and wherein one of said first image pickup portion and said second image pickup portion, and a corresponding one of said floor illuminating means and said side illuminating means, are activated based on said information inputted by said input means.

9. The automatic photograph vending machine according to claim 6, 7, or 8, wherein, in said image pickup means, at least said first image pickup portion has a magnification adjustment means for adjusting magnification of said subject image.

10. The automatic photograph vending machine according to claim 6, 7, or 8, further comprising pose check means for allowing said subject to check his/her own pose, wherein said pose check means are provided in a vicinity of the first image pickup portion, and in a vicinity of said second image pickup portion.

11. An automatic photograph vending method for selling a photograph of a subject, comprising:

picking up an image of said subject in an image pickup region set as a space for image pickup with an image pickup portion prepared in advance, and outputting image data of a subject image; and printing onto a medium a photograph of said subject according to said outputted image data, and thereafter, outputting said medium, wherein said image pickup portion is provided at a ceiling portion of said image pickup region and a direction of image pickup corresponds to a direction of looking down upon said subject from directly above.

12. The method according to claim 11, further comprising printing said photograph onto a medium for photograph printing.

13. The method according to claim 11, further comprising providing a machine-readable storage medium that stores a program for having a computer execute said picking up an image and said printing.

14. The method according to claim 11, further comprising having a computer execute the automatic photograph vending method.

* * * * *